United States Patent

Hunter

Patent Number: 5,380,343
Date of Patent: Jan. 10, 1995

[54] METHOD FOR PREPARING AN ALCOHOL MODIFIED VEGETABLE OIL DIESEL FUEL

[76] Inventor: Herbert F. Hunter, 137 School St., Franklin, Mass. 02038

[21] Appl. No.: 11,730

[22] Filed: Feb. 1, 1993

[51] Int. Cl.⁶ ............................................. C10L 1/02
[52] U.S. Cl. ...................................... 44/302; 44/301; 44/628
[58] Field of Search ......................... 44/301, 302, 628

[56] References Cited

U.S. PATENT DOCUMENTS

| | | | |
|---|---|---|---|
| 3,004,479 | 4/1961 | Schon et al. | 44/302 |
| 4,061,473 | 12/1977 | Norris | 44/301 |
| 4,451,267 | 5/1984 | Schwab et al. | 44/302 |
| 4,526,586 | 7/1985 | Schwab et al. | 44/302 |
| 4,557,734 | 12/1985 | Schwab et al. | 44/302 |
| 4,605,422 | 8/1986 | Goodand et al. | 44/302 |
| 4,744,796 | 5/1988 | Hazbun et al. | 44/302 |
| 4,907,368 | 3/1990 | Mullay et al. | 44/302 |

FOREIGN PATENT DOCUMENTS 2158457  11/1985  United Kingdom.

Primary Examiner—Prince Willis, Jr.
Assistant Examiner—James M. Silbermann
Attorney, Agent, or Firm—Joseph H. Killion

[57] ABSTRACT

Improved microemulsion fuels are prepared from about 70-99% alcohol-fatty acid esters, about 1-30% alcohol and less than 1% alkali metal soap.

2 Claims, No Drawings

METHOD FOR PREPARING AN ALCOHOL MODIFIED VEGETABLE OIL DIESEL FUEL

FIELD OF INVENTION

Recycling is a prime motivant in today's society. Commercial and industrial waste must be converted into useful products. The question arises can we synthesize new and useful products from the waste products of our society? The answer is yes.

For example, waste vegetable oils generated in food preparation may be re-utilized rather than become hazardous or toxic waste materials which require incineration or dumping at sea.

There are many patents relating to conversion of various vegetable oils into diesel type fuels in the prior art.

U.S. Pat. No. 4,397,655 teaches that vegetable oils such as soy bean can be extended by addition of ethanol and stabilized against phase separation by using 2.2-dimethoxy propane.

In U.S. Pat. No. 4,359,324, a large amount of butanol is added to the vegetable oil. This gives a clear burning, smooth-running fuel oil that delivers engine speed and power substantially equal to No. 2 diesel oil fuel. It burns with less exhaust smoke and odor, starts easily without external ignition aids at low temperatures and is compatible in all proportions with No. 2 diesel fuel.

U.S. Pat. No. 4,452,257 teaches that a mixture of low molecular weight alcohol, an aliphatic ester, an aromatic hydrocarbon, a halogenated alkane, a hydroxy unsaturated vegetable oil and an aliphatic hydrocarbon can be added to diesel fuel oils to improve fuel efficiencies and provide cleaner burning fuels, thus reducing engine deposits.

U.S. Pat. No. 4,451,267 teaches that micro-emulsions can be prepared from vegetable oils, a C1-C3 alcohol, water and a trialkylamine. For enhanced water tolerance by the fuel, the amine is pre-reacted with long-chain fatty acid for conversion to the corresponding trialkylammonium soap. Optionally, 1-butanol is added as a co-surfactant to reduce viscosity and the solidification temperature.

U.S. Pat. No. 4,557,734, teaches that micro-emulsions can be prepared from vegetable oil, methanol or ethanol, a straight-chain isomer of octanol, and optionally water. These fuels are characterized by having a relatively high water tolerance, acceptable viscosities and performance properties comparable to No. 2 diesel fuel.

The field of microemulsions is further broadened in U.S. Pat. No. 4,526,586 where the viscosity of the fuel and engine performance is improved.

U.S. Pat. No. 4,744,796 describes a microemulsion fuel which has greater phase stability, reduced smoke particulate and No. 2 emissions.

The use of methanol as a co-surfactant in a microemulsion fuel is described in U.S. Pat. No. 5,004,479.

There is a recognized need to progress from these conversions of "pure-form" vegetable oils to waste product and oil conversion.

SUMMARY OF INVENTION

My invention relates to an improved microemulsion fuel composition and an improved method for making an improved microemulsion fuel from vegetable oils.

I have discovered an improved microemulsion fuel composition which consists essentially of about 70% to 99% alcohol-fatty acid esters, about 1% to 30% alcohol and less than 1% alkali metal soap.

My method for an improved microemulsion fuel comprises filtering the vegetable oils to remove particulate matter. The vegetable oil is then reacted in an alcoholic medium with an alkali metal base. The heat of reaction in the transesterification is usually sufficient. The preferred range of temperature is 40 degrees C. to 60 degrees C. A small amount of alkali metal soap is added as a surfactant. The glycerol layer is then separated from the improved microemulsion fuel composition.

Preferably my improved microemulsion fuel is made from waste vegetable oils, specifically cooking oils. Optionally, pure oils may be utilized which, depending on the composition may or may not require filtering.

Preferably, but optionally, the filters range from the 20 size to 10 or even less, depending on the vegetable oil being utilized.

Also preferably, but optionally, methanol is the alcohol of choice since it is readily available, cheap and suited for my improved microemulsion fuel. Other low carbon chains alchols such as ethanol or butanol may be utilized with the reaction and adjusted for the particular differences from methanol, in order to get the microemulsion fuel.

Also preferably, but optionally, the alkali metal in the alkali metal base utilized is potassium and the base is hydroxide. Other alkali bases would require adjustment to the particular differences from the properties of potassium hydroxide.

It is preferred that the alkali metal soap also be a potassium soap, although optionally, other alkali metal bases can be utilized adjusting from the differences in physical properties from the potassium soap. I have found that about 1% amount of potassium soap is the optimum level. Adjustment would be required in the optional use of another alkali soap.

My invention provides numerous advantages over those microemulsion fuels found in the prior art.

It is an advantage of my invention that it can be manufactured inexpensively from products which previously had to be disposed of by burying or incineration.

Another advantage of my invention is that my microemulsion fuel does not require large scale investment in expensive equipment and may be made at small conversion sites efficiently and economically.

DESCRIPTION OF INVENTION

The modified vegetable oil fuel compositions comprise compositions containing alcohol fatty acids esters, added alcohol and an alkali metal soap surfactant. The modified compositions are manufactured from the commonly available waste or surplus vegetable oils that contain a preponderance of fatty acid ester The vegetable oils are filtered if necessary and transferred to the reaction vessel. An alcoholic solution containing a base such as potassium hydroxide is added to the oil.

The alcohol can be those containing from 1 to 5 carbon atoms in the chain including mixtures; however, methanol is preferred. An excess of alcohol is added beyond that required for the stoichiometrical replacement of the glycerol in the oil. This additional alcohol becomes part of the fuel oil composition. Sufficient base is added to the alcohol to catalyze the replacement of the glycerol by alcohol in the esters. If an excess of base (i.e. potassium hydroxide) is added, potassium soaps are formed which can cause gelling of the glycerol making it difficult to separate the fuel oil composition. A small amount of potassium soap is needed which acts as a surfactant allowing the more volatile alcohol and alcohol-fatty acid esters to form clear solutions. Higher carbon length alcohols can be used but result in higher viscosity fuel compositions.

The mixture of vegetable oil and alcoholic potassium hydroxide is stirred together for several hours at a temperature between 40 degrees C. and 60 degrees C. to insure complete replacement of glycerol in the oil by the alcohol. The agitation then is stopped, allowing the mixture to separate into the lighter-weight improved microemulsion fuel and the heavier glycerol fraction. After standing for several hours, the two layers are separated and the modified vegetable fuel oil composition is polished on a filter. It is now ready to be used "as is" as a diesel fuel or can be blended with petroleum-based diesel fuel or with un-modified vegetable oils to provide a variety of suitable diesel fuel compositions.

The following example is intended only to further illustrate the invention.

EXAMPLE 1

In this example, a modified vegetable fuel oil was prepared by filtering slightly more than 100 gallons of used cooking oil through a set of cloth bed-filters to remove coarse particles of fat, then through 1-20 micron and 1-5 micron filters to polish the oil. A 100 gallon volume of the polished oil was transferred to a 125 gallon reactor. To this was added a 17.5 gallon volume of alcoholic potassium hydroxide solution. This had been prepared previously by mixing for 30 minutes, 15 gallons of methanol and 2.5 gallons of 55% aqueous potassium hydroxide solution. (During mixing, the temperature rose to 38° C. (100° F.) The vegetable oil-alcoholic potassium hydroxide mixture (117.5 gallons) was stirred for 20 minutes with the temperature rising to 50° C.) (122° F.), then allowed to stand for 5 hours. At this time, the heavier aqueous glycerol solution (27 gallons) was removed and the modified vegetable fuel oil transferred to a clean vessel for further cool down. The modified fuel then was filtered through four filters containing 1-10 micron and 3-5 micron filters to remove any contaminents. The modified fuel then was ready for use.

A direct comparison of this modified vegetable fuel was made in a stationary 282 C.I.D. international 6 cylinder in-line diesel engine. No starter fluid was used in either start.

| Conditions | No. 2 Diesel Fuel Oil | Modified Vegetable Fuel Oil |
| --- | --- | --- |
| Radiator temperature before test | 46° C. (114° F.) | 47° C. (117° F.) |
| Exhaust temperature during test | 51° C. (125° F.) | 58° C. (135° F.) |
| Total engine running time | 2 hours | 2 hours |
| Outside temperature | 24° C. (76° F.) | 27° C. (81° F.) |
| High RPM | 2200 | 2175-2200 |
| Radiator temperature after test | 65° C. (149° F.) | 66° C. (150° F.) |
| Exhaust temperature after test | 88° C. (190° F.) | 89° C. (193° F.) |

Comments:
The engine ran quieter using modified vegetable fuel oil with the same power setting than with diesel fuel oil. The RPM drop was 25. The engine did not "hunt" as when using un-modified vegetable oil.

What is claimed is:
1. The method of preparing an improved microemulsion fuel composition from vegetable oils comprising:
    (a) filtering said vegetable oil to remove any particulate matter;
    (b) reacting said vegetable oil in an aqueous solution at an alcoholic medium with an alkali metal base where the alkali of the alkali metal base is selected from the group consisting of lithium, potassium, sodium, rubidium and cesium;
    (c) Adding a small amount of alkali metal soap as a surfactant where the alkali of the alkali metal soap is selected from the group consisting of lithium, potassium, sodium, rubidium and cesium; and (d) separating a aqueous layer from the improved microemulsion fuel.
2. The method of claim 1 wherein step (a) further comprises filtering said vegetable oil in a filter less than 20 microns.

* * * * *